United States Patent [19]

Abber et al.

[11] Patent Number: 5,239,314

[45] Date of Patent: Aug. 24, 1993

[54] THERMALLY INPRINTABLE MEDIA INCORPORATING NON-REUSABLE ADHESIVE

[75] Inventors: Herman Abber, Brockton; Robert H. Lussier, Weymouth, both of Mass.

[73] Assignee: Dennison Manufacturing Company, Pasadena, Calif.

[21] Appl. No.: 723,147

[22] Filed: Jun. 28, 1991

[51] Int. Cl.⁵ .............................................. B41J 2/32
[52] U.S. Cl. ................................... 346/135.1; 380/18
[58] Field of Search ................... 346/135.1; 428/915, 428/916; 380/18

[56] References Cited

U.S. PATENT DOCUMENTS

| | | | |
|---|---|---|---|
| 4,525,416 | 6/1985 | Hammerschmidt et al. | 428/916 |
| 4,826,218 | 5/1989 | Matsuguchi et al. | 428/916 |
| 4,888,601 | 12/1989 | Inui | 346/76 PH |
| 4,933,234 | 6/1990 | Kobe et al. | 428/336 |
| 5,001,749 | 5/1991 | Iggulden et al. | 380/18 |
| 5,011,570 | 4/1991 | Ohbayashi | 428/916 X |

Primary Examiner—Benjamin R. Fuller
Assistant Examiner—N. Le
Attorney, Agent, or Firm—Arthur B. Moore

[57] ABSTRACT

A printing medium for the printing of images thereon to form a document by the printer of a standard facsimile machine in a manner which renders the document unreadable to a casual observer. There is a strip of a flexible printing medium receivable by the facsimile machine, and a strip of an obscuring medium adhesively and removably attached to the printing medium in a manner which will allow the obscuring medium to pass through the facsimile machine in combination with the printing medium The adhesive is a permanently tacky base adhesive into which is mixed a dispersion of fine particles, preferably polytetrafluoroethylene spheroids, which have the effect of reducing adhesive build. The preferred base adhesive is a plasticized blend of a vinyl acetate copolymer emulsion and an ethylene-vinyl acetate copolymer emulsion.

28 Claims, 3 Drawing Sheets

THERMALLY INPRINTABLE MEDIA INCORPORATING NON-REUSABLE ADHESIVE

This invention relates to facsimile transmission systems for sending a document between a sender and a receiver by facsimile in a manner which prevents unauthorized casual reading of the document, and, more particularly, to a printing media for the printing of images thereon to form a document by the printer of a standard facsimile machine in a manner which renders the document unreadable to a casual observer. As an additional benefit, one embodiment provides plain paper output from a standard thermal printhead facsimile machine. The printing media includes a nonreusable covering medium which provides an indication of tempering.

The sending of documents by facsimile is an every increasing phenomenon. On the positive side, facsimile transmission is fast, accurate, and inexpensive. On the negative side, it is like sending a postcard; that is, everyone in the chain of delivery can read the contents of the transmission. This is particularly troublesome where the transmitted document contains personal or privileged information.

Normal mail arrives at its destination in an envelope which can be marked "Confidential", or the like, signifying that it is to be opened only by the addressee. Facsimile transmissions, on the other hand, arrive without an envelope. At best, they have a cover sheet that is the first sheet of the transmission. Marking the cover sheet "Confidential" only acts as a flag to the receiver (and any other intermediaries between the receiver and the designated recipient) that the document contains information that might be interesting to read. With most facsimile equipment, the only way to avoid undesired reading of the materials is for the sender to call the intended recipient by telephone to advise that a confidential facsimile is about to be transmitted and for the intended recipient to go to the facsimile machine and retrieve the document page by page as it is received and transmitted. Certain newer machines provide a "private mail box" capability.

An additional problem of the bulk of contemporary facsimile machines is the use of thermal paper in order to keep the cost of the apparatus down. In order to provide so-called "plain paper" output, a facsimile machine must incorporate the complex and expensive apparatus for xerographic printing, or the like, which drives the cost of the facsimile machine beyond that which most users are willing to pay.

What is also needed is a security facsimile transmission system wherein the security aspects of the transmission can be under the control of the receiver.

A simple and practical solution to these problems has been devised and is shown in U.S. Pat. No. 5,001,749. It involves forming the fax paper with two separable layers, one layer on which the fax message is printed, and another layer which temporarily obscures the message from the casual observer. This multi-layer fax media concept also provides a means for achieving many other benefits. In one of the embodiments of the '749 patent, shown in FIG. 6, an obscuring medium is affixed to thermal facsimile paper. The preferred, obscuring medium is said to be a thick, frangible plastic impregnated with a powdered or granulated metal having a high index of thermal conductivity. The '749 patent teaches that the obscuring sheet may be adhesively secured to the facsimile paper along some or all edges, or may be bonded over the entire surface using conventional removable pressure sensitive adhesive.

An important practical problem that exists in the implementation of this concept of temporarily obscuring the fax message is the physical connection of the obscuring sheet to the message sheet. There is a fundamental contradiction between the need for firmly connecting the two sheets together during printing and delivery of the obscured fax, on one hand, and the need for easy and clean (no undesired residue) separation by the addressee. Likewise, there is a similar contradiction between easy and clean separation by the intended addressee versus the desire to provide clear indication when tampering has occurred.

As noted above, one approach to the connection problem is to provide an adhesive strip along one or both edges of the roll of fax paper. This provides only minimal security because a tamperer can balloon the two sheets apart without disturbing the adhesive edge strips and easily read the unobscured message without leaving a trace of tampering.

It is impractical to seal all four edges because the registration of the page on the roll of fax paper is not predictable.

Furthermore, the concept of adhesive strips on the edges of the fax medium creates inconsistent thickness of the medium across its surface. This, in turn, creates practical manufacturing and handling problems which increase the cost of manufacturing the media and create reliability problems in the printing process.

Many of the problems are resolved by a full-face adhesive layer between the sheets. The presence of such a layer and of the adhesive itself raise additional problems. First of all, it is essential that the layer not interfere with the thermal printing process which, after all, is the primary function.

Of significant practical importance, however, are the shortcomings of conventional adhesives in this application. Permanent-type adhesives would, of course, be totally unsuitable because they would not allow separation of the cover sheet and message without damage to the sheets and would cause possible destruction of the message.

Thus, it would seem that the adhesive must be selected from the class of adhesives called removable adhesives, and this possibility is noted in U.S. Pat. No. 5,001,749. This class of adhesives, having relatively low peel force, would allow separation of the obscuring sheet from the message sheet. Unfortunately, many conventional removable adhesives would leave message-obscuring adhesive residues after separation of the sheets. Furthermore, the conventional removable adhesives would peel message ink from the message sheet in some embodiments of this invention, and thereby permanently destroy the message. Furthermore, conventional low-peel-force adhesives typically exhibit a characteristic called adhesive build, that is, the peel force increases with time. Thus, a low-peel-force adhesive can become a high-peel force adhesive after the adhesive has been in position for a long time. While this situation was acceptable for certain applications (graphic arts and construction), where the ability to do initial repositioning to a permanent position is helpful, the adhesive art addressed this build issue in connection with the development of permanently removable and permanently repositionable note sheets, referred to hereafter as stick-on sheets. The stick-on sheet application required an adhesive system with a clean (no residue), no-build, low-peel-force characteristic with permanent tackiness so that the sheets could be repeatedly repositioned. This result was achieved by distributing a well-spaced dispersion of permanently tacky adhesive spheroids over the sheet surface. Sometimes the spheroids are embedded in a non-tacky matrix. However, because the system is permanently readherable, it would have the problem in the present application that a tamperer could separate the sheet, read the message and then readhere the sheet without leaving any evidence of tampering. These and other difficulties experienced with the prior art devices have been obviated in a novel manner by the present invention.

Wherefore, it is the object of this invention to provide a facsimile transmission receiving medium onto which a received facsimile from a standard facsimile machine can be printed in a manner which will make the resultant copy virtually unreadable to the casual observer.

It is another object of this invention to provide a security facsimile transmission system wherein the security aspects of the transmission are under the control of the receiver.

It is a further object of this invention to provide a facsimile transmission system which will leave a permanent indication of casual tampering with the security of the document.

It is still another object of this invention t provide a facsimile transmission receiving medium onto which a received facsimile can be thermally printed in a manner which will make the resultant copy virtually equal in print quality to that produced by a plain paper copy or facsimile machine.

With these and other objects in view, as will be apparent to those skilled in the art, the invention resides in the combination of parts set forth in the specification and covered by the claims appended hereto.

SUMMARY OF THE INVENTION

This invention involves printing media and an adhesive system for the printing of images thereon to form a document by the printer of a standard facsimile machine in a manner which renders the document unreadable to a casual observer. There is a strip of a flexible printing medium receivable by the facsimile machine for passage therethrough past the printer thereof. The printing medium has a surface for receiving an image from the printer. Additionally, there is a strip of a covering medium adhesively and removably attached to the printing medium in a manner which will allow the covering medium to pas through the facsimile machine in combination with the printing medium. The covering medium has an obscuring portion covering a printing surface of the printing medium upon which the printer prints images for rendering printing on the printing medium unreadable to a casual observer. The obscuring medium is bonded to the printing medium using an adhesive layer which has the property that after separation of the covering medium from the printing medium, these cannot be effectively readhered to each other using said adhesive layer.

The preferred adhesive is a permanently tacky base adhesive into which is mixed a dispersion of fine particles which have the effect of reducing adhesive build. The preferred fine particles are polytetrafluoroethylene spheroids. The preferred base adhesive is a plasticized blend of a vinyl acetate copolymer emulsion and an ethylene-vinyl acetate copolymer emulsion.

The covering medium should be capable of quickly conducting heat vertically from the printhead to the coating on the thermal paper, so as to avoid a spreading of the image. This may be accomplished by using a medium having a relatively hight thermal conductivity, or by employing a very thin covering medium. In the preferred embodiment, the covering medium is a thin tissue paper. While this medium is not a particularly good thermal conductor, it conducts sufficient heat to achieve excellent print quality with standard thermosensitive facsimile papers.

DESCRIPTION OF THE DRAWINGS

The character of the invention may be best understood by reference to one of its structural forms, as illustrated by the accompanying drawings, in which.

DESCRIPTION OF THE PREFERRED EMBODIMENT

Figure 1:
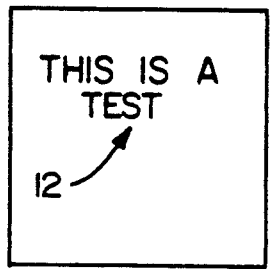
FIG. 1 is a simplified drawing of a document received and printed according to prior art methods and materials where the resultant printing is readily readable by the casual observer.
Figure 2:
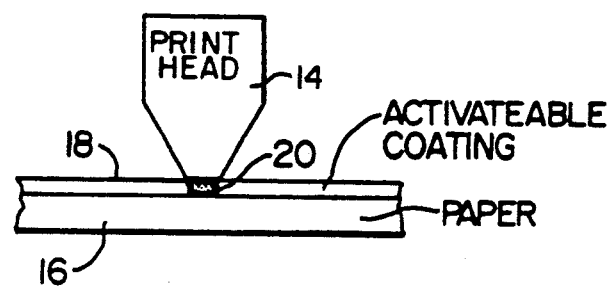
FIG. 2 is a simplified drawing depicting the printing process and materials of a prior art thermal paper facsimile machine.

Turning first to FIG. 1, a document 10 received and printed according to prior art methods and materials is depicted where the resultant printing 12 is readily readable by the casual observer. As mentioned earlier, in a typical prior art standard facsimile machine as available in the marketplace today, the printing 12 of FIG. 1 is accomplished in one of two ways. As depicted in FIG. 2, the most common way is the use of a thermal printhead 14. According to recent figures, this approach accounts for approximately 75% of the facsimile machines presently in use. The printing medium is a roll of paper 16 having a thermally activated coating 18 thereon. The printhead 14 extends transversely across the width of the paper 16 which moves under the printhead during the printing process. The printhead 14 comprises a plurality of heating resistors (not shown) which can be individually heated by the application of a current thereto. When a resistor of the printhead 14 at a particular pixel location is activated and heated to a threshold temperature, the coating 18 thereunder is turned black, as indicated at 20 in the drawing of FIG. 2, thereby creating a visible spot.

Figure 3:
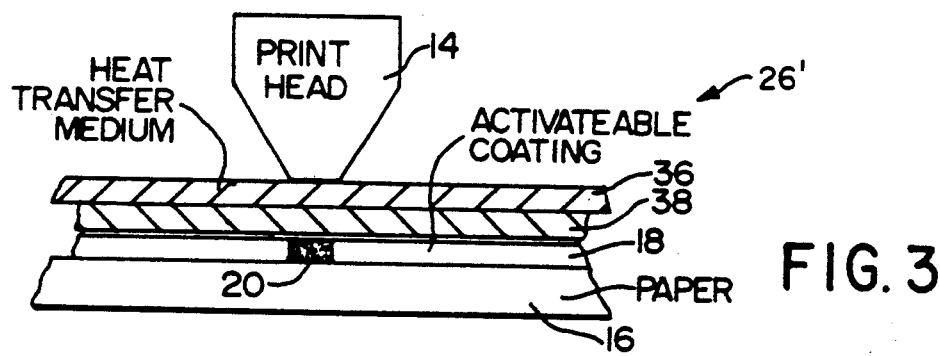
FIG. 3 is a simplified drawing depicting the printing process and materials of a thermally operated facsimile machine employing the methods and materials of the present invention.
Figure 4:
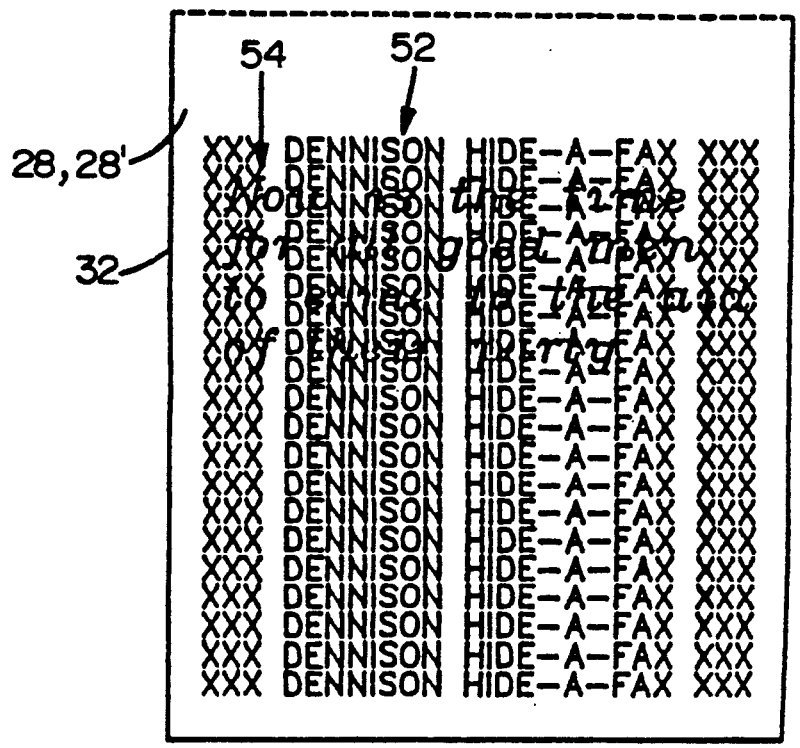
FIG. 4 is a simplified plan view of a printing medium with a transparent covering sheet having an obscuring pattern thereon over a printable sheet bearing a message according to one aspect of the present invention depicting how the obscuring pattern seen through the transparent sheet renders the message readable to the casual observer.

The preferred method and materials for use of the present invention with the thermally operated printing process of FIG. 2 are shown in FIG. 3. In the medium 26' of FIG. 3, the paper 16 having the prior art heat activated coating 18 thereon has a removable, thin, opaque covering sheet 36 thereon. Alternatively, the transfer medium 36 can be translucent or have an obscuring pattern printed thereon. The object is to make it difficult for a casual observer to read images produced on the paper 16 in the coating 18 thereof. The preferred medium 36 is a thin, tough, relatively transparent paper known as capacitor tissue (0.2–0.5 mil, i.e. 5–13 micrometers thick). Note that since the thermal facsimile machines are typically set up to employ a roll of printing medium which is cut to lengths by a built-in rolling cutter, the material of the medium must be a frangible material which can be cut by a rolling cutter or it will jam the cutter. A layer 38 of specially developed adhesive provides full-face-to-face bonding of the obscuring sheet to the heat activatable coating of the paper. Thus, when the printhead 14 heats a particular pixel position, the heat generated is passed quickly and vertically through the covering sheet 36 and adhesive 38 to activate the adjacent pixel position of the coating 18 and thereby create a visible spot (i.e. an activated and black region 20) at that position. To view the document in this embodiment, the covering sheet 36 must be removed to expose the underlying paper 16 with the printing thereon.

A preferred aspect of the invention in all embodiments employed for security purposes is to initially fasten the printing medium to the covering medium in a manner which will disclose if the covering medium has been removed from the printing medium sufficiently for a document printed on the printing medium to be read.

As can be appreciated, where thee is only one person (or set of persons with like security interests) receiving documents on the above-described paper, identifying the addressee is not a concern. Documents are delivered to the receiver and then the cover sheet is removed. Where the addressee is not known, however, the papers resents more of an inconvenience. If standard facsimile etiquette is followed, each document (of one or more pages is preceded by a cover page designating the recipient. In such case, the cover sheet of the cover page is simply removed to reveal the addressee. Where no cover page is employed the receiving station personnel must use care in removing only a sufficient portion of the cover sheet of the first page as required to determine the addressee.

Figure 5:
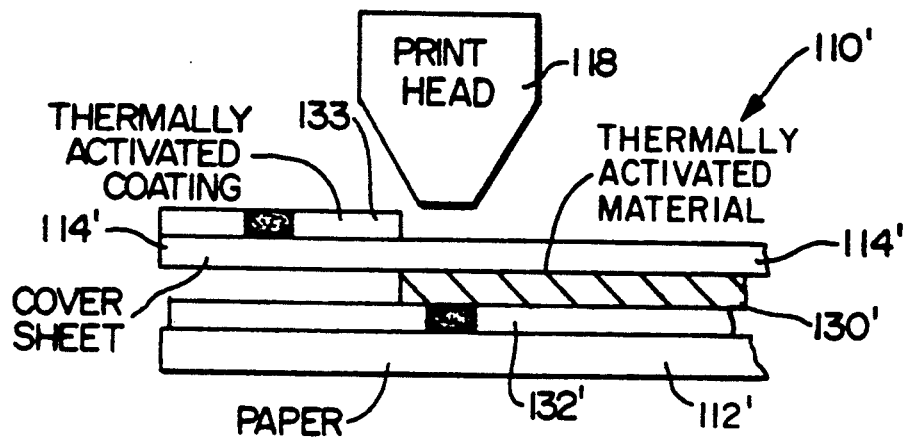
FIG. 5 is an enlarged (not to scale) simplified cross-section of addressable thermal printing security paper of this invention according to an alternate embodiment.

In many instances, the receiving station would prefer to know the identity of the addressee without resort to opening anything, in whole or in part. or example, many hotels are now providing both incoming and outgoing facsimile services for their guests. To provide the confidential benefits thereof, they would be likely to use the above-described paper. As a convenience to them and as evidence of a complete maintenance of security, however, they would prefer to have the addressee identified on the outside of the "envelope" as in a standard mail delivery. A provision for accomplishing that goal will now be describe An edge of a thermal security paper of the type described above and modified for addressability purposes is shown in cross-section in FIG. 5 where it is generally designated as 110'. It should be noted win particularity that the drawing is not to scale. The coatings employed therein, in particular, are shown greatly enlarged in order to make the structure of the paper 110' in general more understandable and apparent. The paper 110' comprises a cover sheet 114' disposed over a paper backing 12'. The cover sheet 114' is preferably attached to the paper backing 112' over the full faces of the sheets but not long the edges thereof with an adhesive 130'. The fact that the edges are not bonded allows the cover sheet to be easily removed from the backing sheet, because the removal can be started at the unbonded edges.

Figure 6:
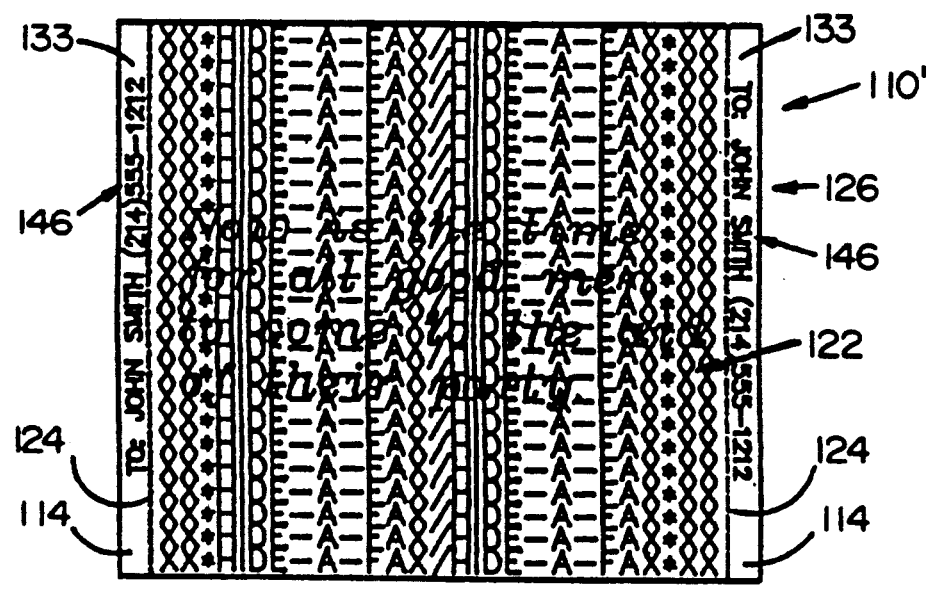
FIG. 6 is a plan view similar to FIG. 4, but with the variation shown in FIG. 5.

As depicted in FIG. 6, if the addressee is designated along the edges of the original document, the addressee portion of the original document will be printed on addressee label formed on the edges of the paper 110' by the strip of thermally activated material 133 along the edges.

While the addressee could be added to the edge of a document by hand or typewriter (by inserting the document sideways into the machine), a computer approach could be employed to add the addressee portion to computer-created documents intended for transmission to the paper 110' of this embodiment.

Finally, as depicted in FIG. 6, in the case of the above-described thermal security facsimile paper wherein the cover sheet comprises a thermally conductive material which transfers heat to a standard thermal paper acting as the paper backing and having a coating of thermally activated material thereon, the cover sheet can be made transparent and merely have no interference pattern along the edges s that addressee information, which is printed on the backing paper, can be viewed therethrough. Where that is not possible, the preferred approach is the same as describe above wherein strips of the thermally activated material are disposed on the top surface of the thermally conductive material of the cover sheet along the edges thereof.

The preferred adhesive is a plasticized blend of a base adhesive and a dispersion of fine polytetrfluoroethylene spheroids. The preferred base adhesive is selected with properties which cause aggressive tack when he adhesive is above room temperature so that the adhesive bonds very well during manufacture. On the other hand, the preferred adhesive would lose much of its tack at room temperature. Thus, at room temperature, if two sheets bonded with the adhesive are pulled apart, they could not be rebonded without the application of heat to reactivate the adhesive.

The presence of the dispersion of fine polytetrafluoroethylene spheroids in the adhesive minimizes adhesive build. That is, once the initial peel-force is established, it remains substantially constant over time. This is in contrast to conventional adhesives that tend to build, i.e., experience significant increases over the initial peel-force over time.

Preferred Formulation

The most preferred formula for the adhesive involved in the present invention is as follows:

| Water-Based Removable Adhesive: | | | | |
|---|---|---|---|---|
| | T.S. (%) | Tg* (°C.) | Adhesive Dry Wt. | Wet Wt. |
| Flexbond 149 | 55 | −30 | 9.7 | 32.25 |
| Flexbond 150 | 55 | −28 | 9.5 | 32.25 |

-continued

| Water-Based Removable Adhesive: | | | | |
|---|---|---|---|---|
| | T.S. (%) | Tg* (°C.) | Adhesive Dry Wt. | Wet Wt. |
| Airflex 405 | 55 | 7 | 5.8 | 19.28 |
| Benzoflex 9-88 | 100 | | 5.2 | 9.51 |
| Teflon 30-B | 60 | | 2.2 | 6.71 |

*Air Products and Chemicals, Inc., Emulsions for Adhesive Products 1983

Alternative Formulation

An alternative formula for the adhesive involved in the present invention is as follows:

| Water-Based Removable Adhesive: | | | |
|---|---|---|---|
| | T.S. (%) | Adhesive Dry Wt. | Wet Wt. |
| Flexbond 149 | 55 | 9.7 | 32.25 |
| Flexbond 150 | 55 | 9.5 | 32.25 |
| Airflex 405 | 55 | 5.8 | 19.28 |
| Benzoflex 9-88 | 100 | 5.2 | 9.51 |
| Teflon 30-B | 60 | 2.2 | 6.71 |
| Thickener* | 22 | 0.30 | 1.34 |

*The thickener was a 3:1 blend by weight of ACRYSOL 60 and ACRYSOL 95 of Rohm & Haas Co., Philadelphia, PA.
Specifications:
Total Solids (%)   62.0 ± 1.0
Viscosity (cps)   6700 ± 500
Wt./gal (lbs)   9.15 ± 0.2

In the above formulations, FLEXBOND emulsions are a family of vinyl acetate copolymer emulsions sold by Air Products and Chemicals, Inc. of Allentown, Pa. AIRFLEX emulsions are a family of vinyl acetate-ethylene copolymer emulsions also sold by Air Products and Chemicals, Inc.

BENZOFLEX 9-88 is a plasticizer compatible with the other components in this system. BENZOFLEX 9-88 is a benzoate ester supplied by Velsicol Chemical Corp., Chicago, Ill., and comprises a dipropylene glycol dibenzoate. The plasticizer contributes to the tack by softening the copolymers.

The most important factor contributing to the reduced adhesion build and clean easy removability is a uniform dispersion of the polytetrafluoroethylene (TFE) particles throughout the adhesive base. The preferred TFE material is TEFLON 30B, which is an aqueous dispersion. TEFLON 30B is a negatively charged, hydrophobic colloid, containing approximately 60 percent (by total weight) of 0.05 to 0.5 micron TFE resin particles (spheroids) suspended in water. It contains approximately eight percent (by weight of TFE) of a non-ionic wetting agent and stabilizer. Viscosity at room temperature is approximately 20 centipoises. Nominal pH is 10.

ACRYSOL 60 and ACRYSOL 95 are polymeric acrylic salts, supplied by Rohm and Haas Co., Philadelphia, Pa., which act as a thickener compatible with the other components in this system. A mixture of ACRYSOL 60 and ACRYSOL 95 is preferred as it yields a stable viscosity, suitable for gravure printing. An alternative thickener is ACRYSOL G-110 of Rohm & Haas Co.

The ratios of the above ingredients may be varied depending upon the degree of tack and adhesion (bond) required. To increase tack and adhesion, either or both of the FLEXBOND constituents can be increased. Additionally or in the alternative, higher tack may be achieved through an increase in the proportion of BENZOFLEX 9-88. To reduce tack, and hence to reduce pressure sensitive adhesion and bond, the proportion of AIRFLEX 405 may be increased.

In a typical prior art application, such as self adhesive labels, the adhesive would be applied at a rate of 15.5 to 18.3 grams per square meter. In applicants' preferred manufacture of their thermally activated receiving medium, the adhesive is applied at a coat weight of 0.33-1.14 grams per square meter.

The invention will be further understood with reference to the following comparative examples

EXAMPLE 1

The adhesive build properties of applicants' preferred adhesive formulation were compared with the properties of a conventional removable pressure sensitive adhesive, according to the following test procedure. A first adhesive sample embodying the preferred formulation was stored for six weeks at room temperature, and another sample was stored for the same period at 140° F. (60° C.). First and second samples of a control adhesive were also stored in this manner. The control adhesive, which was a conventional solvent based removable pressure sensitive adhesive, consisted of a polyisobutylene/resin/oil mixture, the formulation of which is specified below.

| CONTROL ADHESIVE FORMULATION | |
|---|---|
| | Wet wt. % |
| VISTANEX L-80 | 10.32 |
| AMBEROL ST137X | 3.10 |
| AMBEROL M83 | 1.03 |
| INDOPOL H1900 | 5.67 |
| PRIMOL 355 | 5.67 |
| VERSENE | 0.13 |
| SANTOVAR A | 0.08 |
| TOLUENE | 74.00 |

The peel properties of the various samples after storage were tested using a 90° peel at 12 inches (30 cm) per minute. The body stock of the samples was a 50 pound WhiteEnglish Finish paper of Finch Pruyn. Both samples of applicants' preferred adhesive formulation yielded equivalent tack to both glass (a high energy surface) and untreated low density polyethylene (a low energy surface) with an increase in adhesion of approximately 6% on glass and 7% on the untreated low density polyethylene. This compared with increases of adhesion for to the control adhesive of about 25% on glass and 55% on polyethylene. Both samples of applicants' preferred adhesive were tested for removability from untreated polyethylene and polystyrene film, and showed an easy to medium peel from polyethylene as compared to heavy peel for the control. The control produced a very heavy peel to polystyrene while the preferred formulation produced only a heavy peel.

EXAMPLE 2

The adhesive build tests of Example 1 were repeated with other conventional removable pressure sensitive adhesives, with similar results to those of the control adhesive of Example 1. These other adhesives included a formulation based upon 2-ethyl hexyl acrylate, and a natural rubber/resin blend with titanium dioxide (DURO-TAK 36-6159 of National Starch & Chemical Corp., Bridgewater, N.J.).

EXAMPLE 3

Adhesive build tests were carried out using the control adhesive of example 1 and the following adhesive formulations, wherein the proportions of ingredients are given in weight percent:

|  | Alternative Formulation 2 | Base Adhesive |
|---|---|---|
| Flexbond 149 | 23.23 | 25.00 |
| Flexbond 151 | 23.23 | 25.00 |
| Airflex 405 | 30.95 | 33.33 |
| Benzoflex 9-88 | 15.51 | 16.67 |
| Teflon 30B | 7.08 |  |

The control adhesive, alternative formulation 2, and base adhesive were stored for six weeks at room temperature, and subjected to the peel test of Example 1 at various points during this storage period. The results, given in grams per 0.5 inch (13 mm) width, are given in the following tables:

|  | Immediate | 1 day | 7 days | 14 days | 28 days | 42 days | % Increase* |
|---|---|---|---|---|---|---|---|
| *1. Adhesion to Glass* | | | | | | | |
| Control | 235 | 327 | 506 A.T. | 398 | 396 | 410 | 25.4 |
| Base Adhesive | 239 | 272 | L.T. | L.T. | L.T. | L.T. | — |
| Preferred Adhesive | 138 | 282 | 321 | 251 | 285 | 298 | 5.7 |
| *2. Adhesion to Untreated Low Density Polyethylene* | | | | | | | |
| Control | 189 | 342 | 699 A.T. | 543 A.T. | 598 L.T. | 529 | 54.7 |
| Base Adhesive | 155 | 235 | L.T. | L.T. | L.T. | L.T. | L.T. |
| Preferred Adhesive | 140 | 282 | 374 | 292 | 296 | 301 | 6.7 |

*% Increase - Calculated from Day 1 to Day 42 - to allow full "wet-out" of adhesive onto substrate.
A.T. - Adhesive transfer from label stock to substrate
L.T. - Label Tear

EXAMPLE 4

In lieu of the TFE particle dispersion of applicants' preferred adhesive formulations, applicants incorporated a silica dispersion in water (LUDOX, E. I. DuPont DeNemours & Co., Wilmington, Del.) in an alternative adhesive. This adhesive did not reduce adhesive build. Applicants theorize this may be due to the flatter, more elongated shape of the silica particles as compared with TFE particles.

Figure 7:
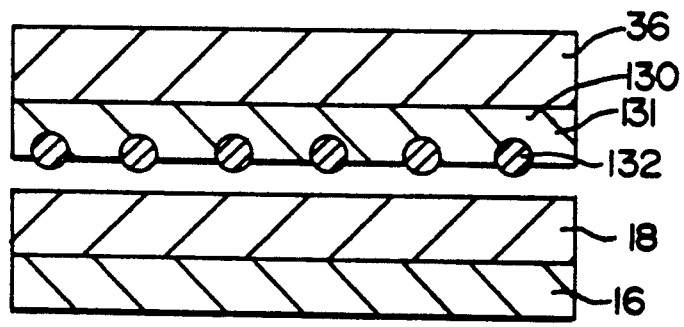
FIG. 7 is a cross-sectional view of the embodiment shown in FIG. 3 before bonding.
Figure 8:
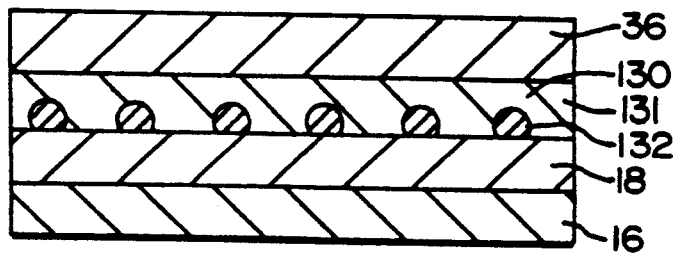
FIG. 8 is a cross-sectional view of the embodiment shown in FIG. 3 and FIG. 7 after bonding.

The unique function of the adhesive 130 is shown in FIGS. 7 and 8. FIG. 7 shows the cover sheet 36 and base sheet 16 (with activatable coating 18) before bonding. The adhesive 130 has a tacky base 131 and particles 132. When the sheets are bonded, the particles 132 limit the contact surface of the adhesive and thereby limit adhesive build.

Having further reference to FIG. 3, the preferred material for the heat transfer medium 36 is a thin tissue paper, preferably a capacitor tissue between 0.2–0.5 mils (5-13 micrometers) thick. In an operative embodiment, the medium 36 consisted of "ND" capacitor tissue of Mount Holly Dielectrics, Mount Holly, Pennsylvania.

It is obvious that minor changes may be made in the form and construction of the invention without departing from the material spirit thereof. Although the printing media of the invention have been illustrated as media for facsimile transmission systems, it should be noted that such media may also be employed with thermal printers when it is desired to obscure the printed image. The thermal printing media of the invention may incorporate a range of constituents for the nonreusable adhesive; for example, other fine particle dispersions (e.g. polymeric dispersions) besides polyfluorocarbon particles, in mixture with a base adhesive. It is not, therefore, desired to confine the invention to the exact form herein shown and described, but it is desired to include all such as properly come within the scope claimed.

We claim:

1. A printing media printed by a thermal printhead, comprised of:
   (a) a strip of a flexible printing medium, said printing medium having a printing surface for receiving an image from the printhead, which is a sheet between 0.2–0.5 mils thick,
   (b) a strip of a covering medium which is a sheet between 0.2–0.5 mils thick, disposed over a surface of said printing medium, having an obscuring portion covering a printing surface of said printing medium upon which the printhead prints images, said obscuring portion conducting heat produced by the printhead at postions of images to cause printing of said images at corresponding positions of said printing surface, and
   (c) an adhesive layer which adhesively attaches said printing surface to said covering medium, wherein after separation of the covering medium from the printing medium, said adhesive layer substantially remains with the covering medium and will not effectively readhere the covering medium to the printing medium.

2. The printing media of claim 1, wherein said adhesive layer is comprised of a base adhesive in which fine particles have been dispersed.

3. The printing media of claim 2, wherein the fine particles are polymeric particles.

4. The printing media of claim 2, wherein the fine particles are polyfluorocarbon particles.

5. The printing media of claim 2, wherein the fine particles are polytetrafluoroethylene particles.

6. The printing media of claim 2, wherein the fine particles are spheroids.

7. The printing media of claim 2, wherein the particles are spheroids and have diameters between 0.05 to 0.5 microns.

8. The printing media of claim 2, wherein the base adhesive is a mixture of a first sub-base having a glass transition temperature between 0° C. and 20° C. and second sub-base having a glass transition temperature between −20°0 C. and −30° C.

9. The printing media of claim 2, wherein the base adhesive is a blend of vinyl acetate copolymer emulsion and ethylene-vinyl acetate copolymer emulsion.

10. The printing media of claim 1, for a facsimile transmission system, wherein a document is sent between a sender and a receiver by facsimile and printed by a thermal printhead of a facsimile machine at the receiver, characterized in that the strip of flexible printing medium is receivable by the facsimile machine for passage therethrough past a printhead thereof, and the strip of covering medium passes through the facsimile machine in combination with said printing medium.

11. The printing media of claim 1, characterized in that:
(a) said printing medium is a thermal paper having a top surface having a coating thereon which changes to a dark and visible color in response to heat, and (b) said covering medium is a sheet covering said top surface of said thermal paper, said sheet being a thin, frangible sheet of paper capable of quickly transmitting heat from the printhead vertically through said sheet to said coating on said thermal paper.

12. The printing media of claim 1, characterized in that:
said obscuring portion further includes means for creating an obscuring pattern over said printing surface rendering images on said printing surface viewed in combination with said obscuring pattern unreadable to at least a casual observer.

13. The printing media of claim 12, characterized in that:
said interference pattern comprises a pattern printed on a surface of said covering medium.

14. The printing media of claim 1, wherein the covering medium is a sheet of paper between 0.2–0.5 mils thick.

15. The printing media of claim 1, wherein the covering medium is capacitor tissue.

16. The printing media of claim 1 wherein the coat weight of the adhesive is between 0.33–1.14 grams per square meter.

17. A printing media printed by a thermal printhead, comprised of:
(a) a strip of a flexible printing medium, said printing medium having a printing surface for receiving an image from the printhead,
(b) a strip of a covering medium comprising a sheet of paper between 0.2–0.5 mils thick, said covering medium being disposed over a surface of said printing medium, having an obscuring portion covering a printing surface of said printing medium upon which the printhead prints images, said obscuring portion conducting heat produced by the printhead at positions on said printing surface, and
(c) an adhesive layer which adhesively attaches said printing surface to said covering medium, said adhesive layer comprising a base adhesive in which fine particles are dispersed wherein after separation of the covering medium from the printing medium, said adhesive layer will not effectively readhere the covering medium to the printing medium.

18. The printing media of claim 17, wherein the fine particles are polyfluorocarbon particles.

19. The printing media of claim 17, wherein the fine particles are polytetrafluoroethylene particles.

20. The printing media of claim 17, wherein the fine particles are spheroids.

21. The printing media of claim 17, wherein the base adhesive is a mixture of a first sub-base having a glass transition temperature between 0° C. and 20° C. and a second sub-base having a glass transition temperature between −20° C. and −30° C.

22. The printing media of claim 17 wherein the covering medium is capacitor tissue.

23. The printing media of claim 17 wherein the coat weight of the adhesive is between 0.33–1.14 grams per square meter.

24. A printing media printed by a thermal printhead, comprised of:
(a) a strip of a flexible printing medium, said printing medium having a printing surface for receiving an image from the printhead,
(b) a strip of a covering medium comprising a sheet of paper between 0.2–0.5 mils thick, said covering medium being disposed over a surface of said printing medium, having an obscuring portion covering a printing surface of said printing medium upon which the printhead prints images, said obscuring portion conducting heat produced by the printhead at positions of images to cause printing of said images at corresponding positions of said printing surface, and
(c) an adhesive layer which adhesively attaches said printing surface to said covering medium, said adhesive layer comprising a continuous layer which is coextensive with said covering medium except for at least one edge portion of said covering layer at which said adhesive layer is missing, wherein after separation of the covering medium from the printing medium, these cannot be effectively readhered to each other using said adhesive layer, said adhesive layer being comprised of a base adhesive in which fine particles have been dispersed, having a coat weight between 0.33–1.14 grams per square meter.

25. The printing media of claim 24, for a facsimile transmission system, wherein a document is sent between a sender and a receiver by facsimile and printed by a thermal printhead of a facsimile machine at the receiver, characterized in that the strip of flexible printing medium is receivable by the facsimile machine for passage therethrough past a printhead thereof, and the strip of covering medium passes through the facsimile machine in combination with said printing medium.

26. The printing media of claim 24, wherein the fine particles are polymeric particles.

27. The printing media of claim 24, wherein the fine particles are polyfluorocarbon particles.

28. The printing media of claim 24, wherein the fine particles are polytetrafluoroethylene particles.

* * * * *